AMPLITUDE MODULATION SIGNAL CORRECTION SYSTEM

Filed July 13, 1948 4 Sheets-Sheet 1

INVENTOR
JOHN HAYS HAMMOND, JR.
BY Harry Tunick
ATTORNEY

AMPLITUDE MODULATION SIGNAL CORRECTION SYSTEM

Filed July 13, 1948 4 Sheets-Sheet 2

INVENTOR
JOHN HAYS HAMMOND, JR.
BY Harry Tunick
ATTORNEY

INVENTOR
JOHN HAYS HAMMOND, JR.
BY Harry Tunick
ATTORNEY

March 21, 1950 J. H. HAMMOND, JR 2,501,330

AMPLITUDE MODULATION SIGNAL CORRECTION SYSTEM

Filed July 13, 1948 4 Sheets-Sheet 4

INVENTOR
JOHN HAYS HAMMOND, JR.
BY Harry Tunick
ATTORNEY

Patented Mar. 21, 1950 2,501,330

UNITED STATES PATENT OFFICE 2,501,330

AMPLITUDE MODULATION SIGNAL CORRECTION SYSTEM

John Hays Hammond, Jr., Gloucester, Mass., assignor to Radio Corporation of America, New York, N. Y., a corporation of Delaware Application July 13, 1948, Serial No. 38,463

6 Claims. (Cl. 250—6)

Figure 1:
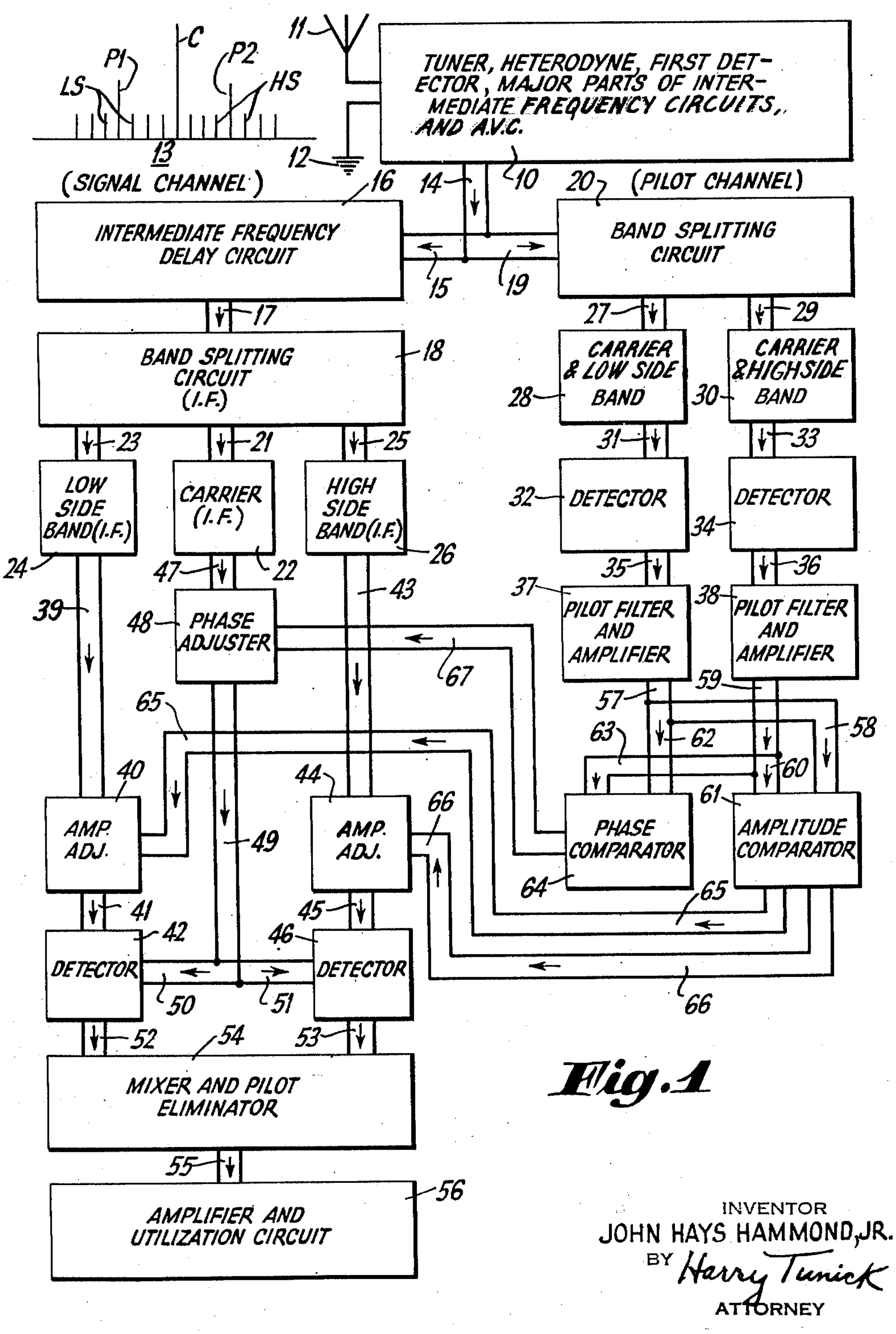

This invention relates to improvements in the quality of received signals which have been subjected to selective fading. It is especially useful for converting and demodulating signals which are to be rebroadcast in accordance with my U. S. Patent #1,313,860, and for making recordings which may be made available subsequently to the listening public by radio or by pressings.

It is well known that systems of radio telephonic communication of the type using carrier and a single side band, or single side band alone, have improved properties as to selective fading. However, a large number of transmission channels in use are not of this type, and the present invention relates especially to radio telephonic channels employing a carrier and both side bands.

In this type of transmission, the carrier and side bands start out related as in amplitude modulation. But in transmission, very often the medium operates differently on the low side band, the carrier, and the high side band, so that as received, the wave represents one with amplitude modulation in combination with phase or frequency modulation. That is, the two signals produced by demodulating the carrier and a low side frequency, and by demodulating the carrier and a high side frequency are not in general equal in magnitude and equal in phase, as they would be if the wave which is demodulated represents pure amplitude modulation.

It is the object of this invention to restore the wave form to the amplitude modulated condition prior to demodulation, so that the two outputs will properly cooperate in producing a final signal in the utilization circuit.

In this invention, I employ a pilot transmission which may consist of one or a plurality of modulating frequencies which are mixed in with the transmitter signal frequencies. For some purposes, the pilot transmission may be of the order of 800 cycles per second, or perhaps the geometric mean of the lowest and highest modulating frequencies normally to be transmitted and utilized in the receiver. In other cases, the pilot transmission may contain frequencies at the lower or higher end, or both, of the useful transmitted modulation band. For simplicity, however, I disclose a system in which only one pilot frequency is used. This pilot frequency is mixed with the signal frequencies prior to modulation of the radio carrier, and is subjected to the same selective fading and distortion effects as the signal in transmission. At the receiver, the relation between the carrier and the two pilot side frequencies is in effect examined and utilized to restore the carrier and the signal side bands to the proper amplitude modulation relationship. This results in an improved quality of transmission.

The nature of the invention will be better understood from the following description, taken in connection with the accompanying drawings, in which certain specific embodiments have been set forth for purposes of illustration.

Figure 2:
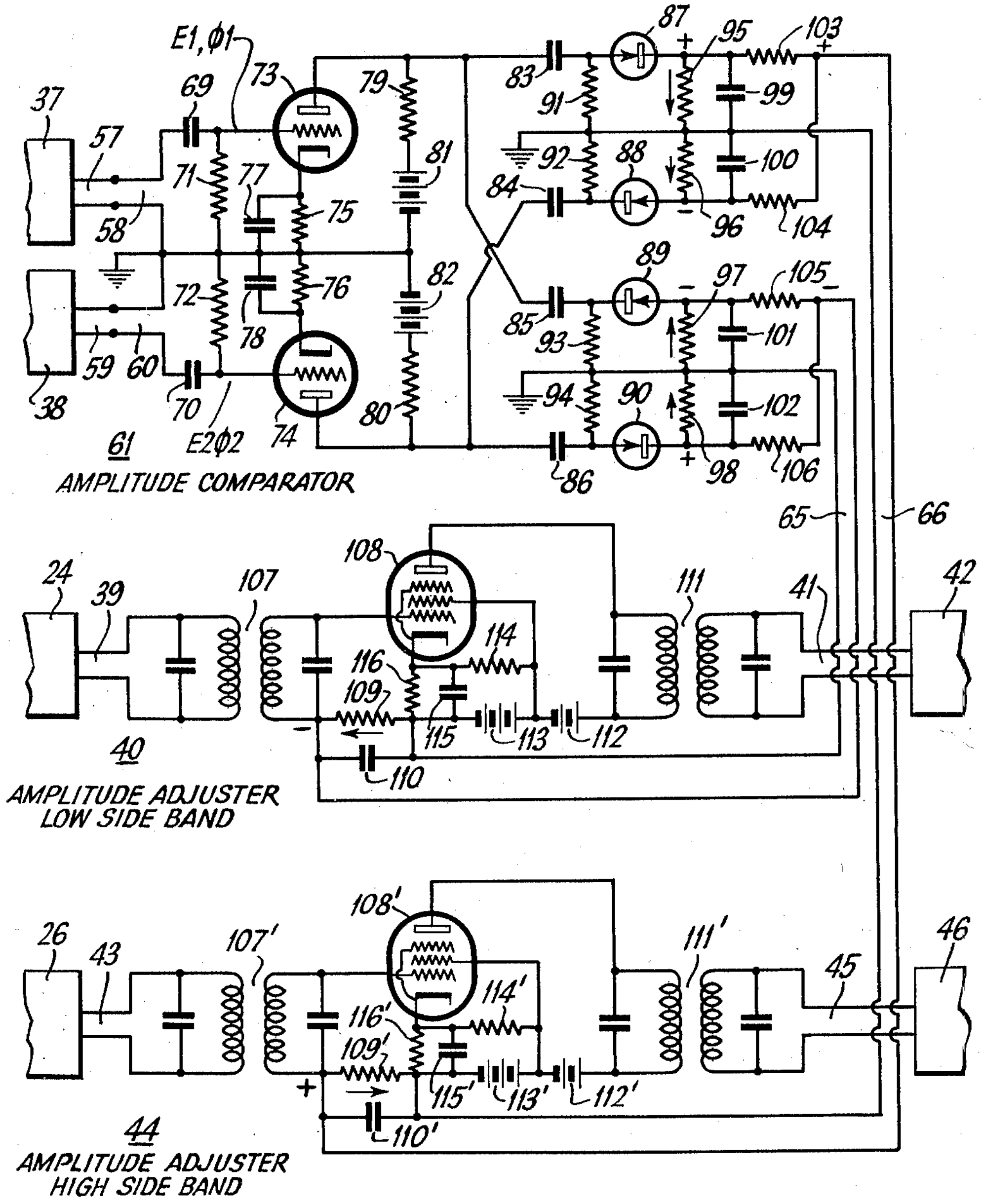
Figure 3:
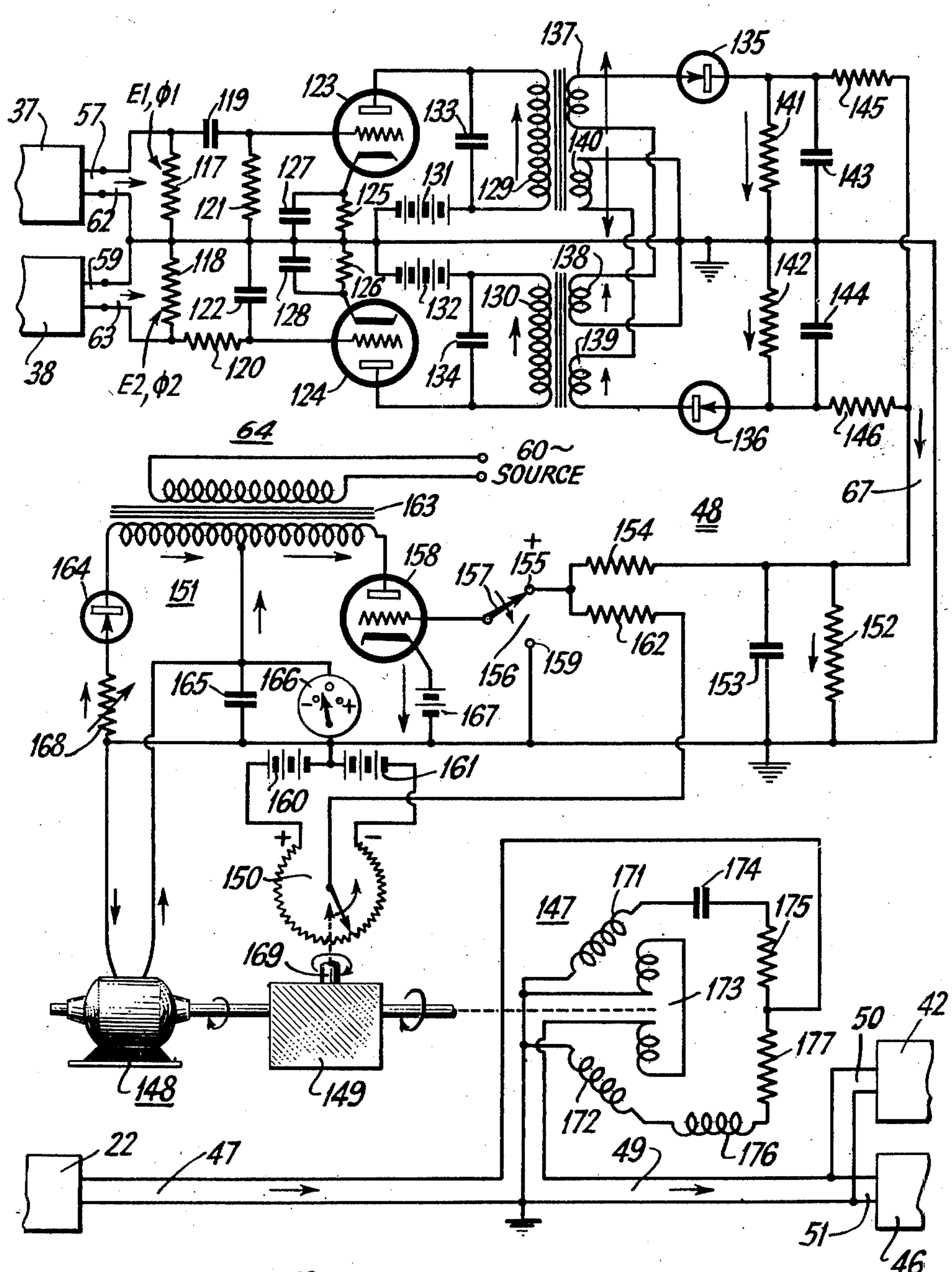

In the drawings:

Fig. 1 is a schematic block diagram illustrating by labeled rectangles and connections a system arranged in accordance with my invention for receiving, amplifying and demodulating signals transmitted as a carrier and associated low and high side bands, Fig. 2 illustrates the details of portions of the system of Fig. 1 relating to the use of the pilot frequency for making amplitude corrections, Fig. 3 illustrates the details of portions of the system of Fig. 1 relating to the use of the pilot frequency for making phase corrections, and Figs. 4*a* to 4*h* illustrate the relationships between electrical voltages of various wave components, at different parts of the diagram of Fig. 1 and Fig. 3.

Fig. 1 illustrates by schematic representation the essential features of a receiving system arranged for operation in accordance with my invention. In rectangle 10 is located the initial circuits of the receiver system, such as the tuner, heterodyne, first detector, the major parts of the intermediate frequency circuits, and the automatic volume control system of a superheterodyne system for receiving amplitude modulated signals. To the input of this rectangle is connected an antenna 11 and ground 12, upon which are impressed the transmitted wave shown spectrally by 13 at the left of the antenna. This wave comprises a carrier C, lower side signal band LS, higher side signal band HS, lower side pilot frequency $P_1$, and higher side pilot frequency $P_2$. Of these, C, $P_1$ and $P_2$ are transmitted continuously, while LS and HS are variably off and on, with various distributions in accordance with the signal modulation. It will be understood that due to the nature of the transmission medium $P_1$ and $P_2$ are not necessarily of equal magnitude, and that the angle between the vector representations of C and $P_1$ is not necessarily the same as the angle between the vector representations of $P_2$ and C. Furthermore, similar differences will exist between the various components LS, C and HS. The output of rectangle 10 is of similar nature spectrally to the input 13, except that the frequencies of all components have been lowered from radio to intermediate frequency by the heterodyne process. The rectangle 10 is connected through output leads 14 and 15 to an intermediate frequency delay circuit 16, the output of which is connected by leads 17 to a band splitting circuit 18. The delay circuit has the purpose of allowing the control circuits associated with the pilot frequencies sufficient time to operate, and may take the form of an artificial transmission line. The rectangle 10 is also connected through leads 14 and 19 to a band splitting circuit 20. The energies in the inputs to the two band splitting circuits 18 and 20 are of similar nature, except that the wave form of the input to circuit 18 occurs after a like wave form has just previously occurred in the input to circuit 20. Although these wave forms both include representatives of the entire received wave form, only the carrier and signal side bands are of importance for circuit 17, and only the carrier and pilot side frequencies are of importance for circuit 20. Therefore, the rectangles 16 and 18, and all below them will be referred to as the signal channel, and rectangle 20 and all below will be referred to as the pilot channel. Certain connections to be described later provide for control of the operation of the signal channel from the pilot channel, so that the pilot channel may also be considered to be a control channel.

The band splitting circuit 18 of the signal channel operates to separate the carrier, lower side band, and upper side band into three individual channels by which these components of the signal may be separately treated. Thus, output leads 21 provide carrier energy to rectangle 22; output leads 23 provide lower side band energy to rectangle 24; output leads 25 provide high side band energy to rectangle 26. The circuits of rectangles 22, 24, 26 may provide for further purification of the three selected energies, by circuits which eliminate more completely the unwanted components. The circuits are so adjusted that if the outputs of the circuts 22, 24, 26 were again recombined, the resulting wave form would be substantially the same as in the input to the circuit 18.

In the pilot or control channel, the band splitting circuit 20 separates out energy representative of the carrier and lower side band, and energy representative of the carrier and high side band, and feeds these energies through leads 27 and 29 respectively to circuits 28 and 30. Here the arrangements are such that if the outputs of circuits 28 and 30 were recombined, the resulting wave form would be substantially the same as in the input to band splitting circuit 20. The output of circuit 28 is connected by leads 31 to a detector 32, and the output of circuit 30 is connected by leads 33 to a detector 34. The outputs of these detectors, which contain currents of frequencies corresponding to the signal and pilot frequencies introduced into the transmitter prior to modulation, are connected by leads 35 and 36 to pilot filter and amplifier circuits 37 and 38, which discard the unrequired signal components and retain the pilot components for future use in controlling the operation of the signal channel.

The circuits employed so far are conventional and can be readily provided by those skilled in the art, and need not be described in detail. It will be understood that the system is accurately lined up so that the relation of the outputs of pilot filters 37 and 38 as to magnitude and phase will correspond to the relations between the carrier C, low band pilot frequency $P_1$ and high band pilot frequency $P_2$, both as they exist compositely in the input to circuit 10, and as they exist individually in the circuits 22, 24 and 26. It will be further understood that the pilot side frequencies $P_1$ and $P_2$ of spectrum 13 receive the same general treatment in transmission as the low and high side signal bands LS and HS, and that corrections applied from circuits 37 and 38 to the pilot elements in the signal channel will serve also to correct the signal elements.

The output of low side band circuit 24 is connected through leads 39 to amplitude adjuster circuit 40, the output of which is connected by leads 41 to detector 42. Similarly, the output of high side band circuit 26 is connected through leads 43 to amplitude adjusted circuit 44, the output of which is connected by leads 45 to detector 46. Carrier energy for demodulating the low and high side bands applied to these detectors 42 and 46 is supplied from carrier circuit 22, which is connected through leads 47 to a phase adjuster 48, the output of which is applied through leads 49 and 50 to the detector 42, and also through leads 49 and 51 to the detector 46. In general, the amplitude adjusters 40 and 44 may be variable gain amplifiers, to be controlled from the pilot filter circuits 37 and 38 such that the side band energies in leads 41 and 45 are equal. Under these conditions, with detectors of like characteristics, and equal carrier signals applied to both, the pilot and therefore the signal output of detector 42 will be the same as the pilot and therefore the signal output of detector 46, as far as magnitudes are concerned. Also, the phase adjuster 48 may be a variable phase shifting device, to be controlled from the pilot filter circuits 37 and 38 such that the numerical angle between the carrier and side band vectors for detector 42 is the same as the numerical angle between the carrier and side band vectors for detector 46. In other words, the amplitude and phase adjusters 40, 44, 48 are to operate such that the carrier and side bands are related as in amplitude modulation, as regards the operation of the detectors 42 and 46, so that their individual outputs of the pilot and therefore of the signal frequencies will be of the same magnitude and the same phase.

The outputs of the two detectors 42 and 46 are connected individually by leads 52 and 53 to a mixer and pilot eliminator 54, wherein the outputs are combined additively, and the pilot frequency component eliminated, as by a sharply selective filter. The signal output is then applied by leads 55 to a further amplifier and utilization circuit 56, which may be a loudspeaker, or recorder, or input to a repeater radio transmitter. In this manner the tonal quality produced in utilization circuit 56 may be made to approach that which would have been possible if the transmitted signals of spectrum 13 had been related as in amplitude modulation.

To provide for the control of the amplitude adjusters 40 and 44 and the phase adjuster 48, the outputs of pilot filters 37 and 38 are connected through leads 57 and 58, and 59 and 60 to the two inputs of an amplitude comparator 61; and the outputs of these pilot filters are also connected through leads 57 and 62, and 59 and 63 to the two inputs of a phase comparator 64. The amplitude comparator is connected by leads 65 and by leads 66 to the control inputs of amplitude adjusters 40 and 44 respectively, while the phase comparator 64 is connected by leads 67 to the control input of phase adjuster 48.

In operation, the amplitude comparator 61 compares the outputs of the pilot filter circuits 37 and 38 as to magnitude, and modifies the gains of the amplitude adjusters 40 and 44 in corrective senses such that the signals in the leads 52 and 53 become of equal value. Similarly, the phase comparator circuit 64 compares the outputs of the pilot filter circuits 37 and 38 as to phase, and modifies the phase change of the carrier in passing through the phase adjuster 48 in a corrective sense such that the detected signals in the leads 52 and 53 become of the same phase. The delay circuit 16 provides suitable delay so that the controls start to be operative somewhat prior to the arrival of the signals which are to be controlled, to reduce the effects of the time constants of the control circuits. In this manner, the combined signal in utilization circuit 56 is of much higher quality than if the pilot transmission had not been used to correct for the deficiencies of transmission.

Since the devices which may be used for amplitude comparison and adjustment by circuits 61, 40, 44 and for phase comparison and adjustment by circuits 64 and 48 are not well known in the art, it is desirable to show illustrative circuits, and therefore, I have shown in Fig. 2 the details of a typical amplitude comparison and adjustment circuit, and in Fig. 3 the details of a typical phase comparison and adjustment circuit. For clarity, I show these connected between terminal circuits and by leads corresponding to the circuits and connections depicted in Fig. 1. For illustrative purposes, conditions are shown when the transmission conditions are such that the output voltage from pilot filter 37 is greater than that from pilot filter 38, and leads in phase by about 90 electrical degrees.

In Fig. 2 is shown the amplitude comparator 61, driven from pilot filter circuits 37 and 38, controlling through leads 65 the passage of low side frequency energy from low side band circuit 24 through amplitude adjuster 40 to the detector 42, and controlling through leads 66 the passage of high side frequency energy from high side band circuit 26 through amplitude adjuster 44 to the detector 46. These circuits together with the connecting leads are numbered identically with corresponding circuits and lines of Fig. 1.

In this present figure, voltage from circuit 37 is impressed through leads 57, 58 and by coupling capacitor 69 and input resistor 71 upon the grid of a rectifier driver tube 73, voltage from circuit 38 is impressed through leads 59, 60 and by coupling capacitor 70 and input resistor 72 upon the grid of a rectifier tube 74. For clarity, elements associated with or driven by tube 73 are assigned odd numbers, and those associated with or driven by tube 74 are assigned even numbers, for the entire amplitude comparator circuit. For reference, the markings $E_1$, $\phi_1$, and $E_2$, $\phi_2$ at the grid leads of tubes 73 and 74 indicate the magnitudes and phase angles of the voltages impressed upon the grids, and the illustrations refer to a condition where $E_1$ is greater than $E_2$ in a ratio of about two to one, and $\phi_1$ is $\phi_2$ plus ninety electrical degrees.

The cathodes of tubes 73 and 74 are connected to ground through cathode bias resistors 75 and 76, bypassed by capacitors 77 and 78. The anode plates of tube 73 and 74 are connected by resistors 79 and 80 to the positive ends of batteries 81 and 82, the negative ends of which are connected to ground. The anode plate of tube 73 is connected through capacitors 83 and 85 to the anode of rectifier 87 and the cathode of rectifier 89, and the anode plate of tube 74 is connected through capacitors 84 and 86 to the cathode of rectifier 88 and the anode of rectifier 90. These rectifiers may be of the crystal or copper oxide type, or a thermionic diode may be used if desired. The terminals of these rectifiers are connected to ground through resistors 91 to 94 and resistors 95 to 98, the latter set of which are shunted by filtering capacitors 99 to 102. One side of line 66 is connected to ground, and the other side is connected through resistor 103 to the cathode of rectifier 87, and through resistor 104 to the anode of rectifier 88; one side of line 65 is connected to ground and the other side is connected through resistor 105 to the anode of rectifier 89 and through resistor 106 to the cathode of rectifier 90. It is thus evident that a rectifier system is provided to develop D.-C. voltages across resistors 95 and 97 due to the impressed A.-C. voltage $E_1$, $\phi_1$; and to develop D.-C. voltages across resistors 96 and 98 due to the impressed A.-C. voltage $E_2$, $\phi_2$. The D.-C. currents flowing in these resistors are indicated by arrows, the senses being determined by the rectifier connections, and the magnitudes by the A.-C. voltages. The elements of the circuits are balanced such that, for example, the currents in the four resistors 95 to 98 will be all numerically equal if $E_1$ and $E_2$ are equal. It will be noted that the values of $\phi_1$ and $\phi_2$ are irrelevant as far as the magnitudes and senses of the rectified currents are concerned.

With equal resistors 103 and 104, it is apparent that the D.-C. potential of the non-ground wire of line 66 will be the mean of the D.-C. potentials, assuming the far end is not loaded. Thus, in the present instance with the current in resistor 95 exceeding that in resistor 96 making the cathode of rectifier 87 numerically more positive than the anode of rectifier 88 is numerically negative, a positive voltage is developed for the line 66. Correspondingly, the rectifier system develops a negative voltage for the line 65 since the anode of rectifier 89 is more negative than the cathode of rectifier 90 is positive. Thus, in general, no voltage is developed on lines 66 and 65 if $E_1=E_2$; the voltage on line 66 is positive and that on line 65 is negative if as in the illustrated condition $E_1>E_2$; the voltage on line 66 would be negative and that on line 65 would be positive if conditions were such that $E_1<E_2$. While the load on the far end of the lines 66 and 65 determines the amount of the voltage on the line, it does not determine the sense of the voltage as long as the load does not of itself contain a voltage source.

The amplitude adjusters 40 and 44 may be of identical construction, but since they operate in opposite senses, both adjusters are shown. The adjuster 40 will be described in detail, and parts of adjuster 44 corresponding to those of 40 will be indicated by primed numbers.

The low side band circuit 24 is connected by line 39 to the primary side of an intermediate frequency transformer 107. One terminal of the secondary of transformer 107 is connected to the first or control grid of a pentode amplifier tube 108, and the other terminal is connected through resistor 109 to ground, paralleled by capacitor 110. The ground side of line 65 is connected to the grounded end of resistor 109, and the active side, in the present case at negative potential, is connected to the junction of resistor 109 and the secondary of transformer 107. The anode plate of tube 108 is connected through the primary of an intermediate frequency transformer 111 to the positive end of battery 112, the negative end of which is connected to the positive end of battery 113, the negative end of which is connected to ground. The positive end of battery 113 is connected to the second or screen grid of tube 108, and is connected through the bleeder resistor 114 to the cathode and the third grid of tube 108, which in turn are connected to ground through resistor 116 shunted by capacitor 115. The constants are so chosen that when the voltage from line 65 is zero, the tube 108 operates with somewhat higher grid bias than corresponding class A amplifier operation, producing a moderate amplifier gain. The gain of the system is increased whenever a positive voltage is impressed upon the grid circuit across resistor 109, and is decreased whenever as in the instance shown, the voltage impressed into the grid circuit from line 65 is negative. The circuit for adjuster 44 operates in a similar fashion, but it will be noted that whenever the gain of one of circuits 40 and 44 is higher than normal, the gain of the other is less than normal. In this manner, the amplifier can be adapted to compensate for a very high or very low ratio of voltages $E_1$ and $E_2$. It will be noted from Fig. 1 that the ratio of side band outputs of circuits 24 and 26 is also the ratio of $E_1$ to $E_2$. Therefore, the amplifier with the weaker input signal has the greater gain, and the one with the stronger input signal has the lesser gain. The constants are so chosen that the ratio of side band inputs to detectors 42 and 46 will be close to unity, over a wide value of ratios of outputs of circuits 24 and 26. The signal level at the inputs of the amplifiers 108 and 108' will be adjusted to be sufficiently low so that little or no wave form distortion results, although the amplifier with the lowest gain is receiving the greater signal. Thus, provision is made to provide about the same amount of low side band energy for detector 42 as high side band energy for detector 46, so that with equal carrier values, the detected outputs will be closely equal.

In Fig. 3 is shown the phase comparator 64, driven from pilot filter circuits 37 and 38, and controlling through leads 67 the amount and sense of phase shift of the intermediate frequency carrier in passing from carrier circuit 22 through phase adjuster 48 to the detectors 42 and 46. In this circuit, the output of pilot filter 37 is connected by lines 57 and 62 to the terminals of a resistor 117, and the output of pilot filter 38 is connected by lines 59 and 63 to the terminals of a resistor 118, with one end of each of these resistors 117 and 118 connected to ground. The other end of resistor 117 is connected to ground through a phase advancer circuit comprising capacitor 119 and resistor 121 in series, with the junction between these elements connected to the grid of an amplifier tube 123. The other end of resistor 118 is connected to ground through a phase lagging circuit comprising resistor 120 and capacitor 122 in series, with the junction between these elements connected to the grid of an amplifier tube 124. The impedances of all elements 119 to 122 are made numerically equal for the pilot frequency, and of sufficiently low value so that the input impedances of the tubes 123 and 124 produce negligible effect. In this case, the circuit 119, 121 produces a phase advance of 45°, and the circuit 120, 122 produces a phase lag of 45°, with equal drops in the signal strength in the two cases. Thus, if the voltages across resistors 117 and 118 to ground are $E_1$, $\phi_1$, and $E_2$, $\phi_2$, respectively, then the voltages from grid to ground for tubes 123 and 124 will be .707 $E_1$, $(\phi_1+45)$, and .707 $E_2$, $(\phi_2-45)$ respectively. The net result, therefore, is a 90 degree phase advance of the voltages for tubes 123 and 124 with respect to the advance of the phase of the output of 37 with respect to that of 38, with no relative change in the ratio of signal strengths. For the illustration example, with the voltage across resistor 117 leading that across resistor 118 by ninety electrical degrees, it is seen that the additional phase shift causes the tubes 123 and 124 to be driven with 180 degrees difference of phase, so that the grid voltage of one has a peak maximum when the grid voltage of the other has a peak minimum. While under other conditions the phase relations may be numerically different, there will be a net advance of 90 degrees of the relative phases of the signals due to the circuits 119 to 122.

The cathodes of tubes 123 and 124 are connected to ground by bias resistors 125 and 126, shunted by capacitors 127 and 128. The anode plates of these tubes are connected through inductors 129 and 130 to the positive ends of batteries 131 and 132, the negative ends of which are connected to ground. The inductors 129 and 130 may be shunted by capacitors 133 and 134, to provide resonant circuits tuned to the pilot frequency, due care being taken that the entire system is balanced so that the currents in the inductors 129 and 130 will have the same ratio as the input voltages $E_1$ and $E_2$ but with the proper ninety degree phase advance relation. In the present instance, the current in inductor 129 is indicated as being twice that in inductor 130, with a total phase difference of 180 degrees, corresponding to the ninety-degree difference in the inputs to the system plus the ninety-degree shift created by elements 119 to 122.

The two inductors 129 and 130 are the primaries of transformers each with two secondaries, which are cross coupled to a rectifier system. Thus, the anode of a rectifier 135 is connected to ground through secondary 137 coupled to inductor 129, and through secondary 138 coupled to inductor 130, while the cathode of rectifier 136 is connected to ground through secondary 139 coupled to inductor 130 and through secondary 140 coupled to inductor 129. It will be noted that one of the windings, such as 140, is wound in a reverse sense, so that in effect one rectifier is driven in accordance with the vector difference between the primary currents, while the other rectifier is driven in accordance with the vector sum of the two primary currents. Thus, for the illustrative example, the magnitudes and senses of the voltages induced into the secondaries may be as indicated by the arrows associated with the individual secondaries, whereby in a balanced system with 180 degrees difference of primary currents, the net A.-C. voltage impressed upon rectifier 135 is seen to be three times the voltage impressed upon rectifier 136. Or if, for example, there were zero phase difference between the primary currents, resulting, for example, in a reversal of the arrows for couplings 138 and 139, then the rectifier 135 would be driven by only one third of the voltage by which rectifier 136 is driven. Finally, if the primary currents were quadrature related, as for example, with the input from 37 and 38 either in phase, or 180 degrees different in phase, then the rectifiers 135 and 136 would be equally driven, since the numerical value of the vector sum of two vectors is equal to the numerical value of the vector difference of those vectors, provided the two vectors are at right angles. Accordingly, the relative difference of drives of rectifiers 135 and 136 may be taken as a measure of the phase difference of the inputs to the comparator system.

The cathode of rectifier 135 is connected to ground through resistor 141 shunted by filter capacitor 143, and the anode of rectifier 136 is connected to ground through resistor 142 shunted by filter capacitor 144. One side of line 67 is connected to ground, and the other side is connected through resistors 145 and 146 to the cathode of rectifier 135 and the anode of rectifier 136, respectively. Thus the voltage of the ungrounded side of line 67, under no load at the far end, is the mean of the voltages across the rectifier output resistors 141 and 142, and in the present illustrated instance it will be a positive voltage. In general, the open circuit output voltage $E_{67}$ will be given very closely by $$E_{67}=kE_1E_2 \sin (\phi_1-\phi_2)$$

where $k$ is a constant of the system, $E_1$, $E_2$, $\phi_1$ and $\phi_2$ refer to the magnitudes and phase angles of the input voltages to the system. This formula is analogous to that for the output torque of a two-phase induction motor. The voltage developed by the phase comparator may, therefore, be a measure of the phase difference between the input signals from sources 37 and 38.

The phase adjuster circuit is of an electromechanical type utilizing a continuously variable phase shifter 147 driven from a D.-C. motor 148 with a permanent magnet field, through a gear reducer 149, which also drives a potentiometer 150 with the sense of rotation and the speed of rotation of motor 148 determined by the operation of a D.-C. amplifier system 151 in accordance with the D.-C. voltage impressed upon the line 67 and the position of the potentiometer and phase shifter. This constitutes a type of electromechanical servo mechanism, with D.-C. input and mechanical output.

More specifically, resistor 152 shunted by capacitor 153 is connected across the control line 67 across which the control voltage is impressed upon the system. In the case illustrated, the voltage impressed is positive. The ungrounded end of resistor 152 is connected through resistor 154 to a contact 155 of a single pole double throw switch 156, the moving blade 157 of which is connected to the grid of a triode tube 158, and the other contact 159 of which is connected to ground. Normally the blade is closed on contact 155 as depicted. The terminals of potentiometer 150 are connected to the positive and negative ends respectively of equal voltage batteries 160 and 161, the other ends of which are connected to ground, whereby the moving arm of the potentiometer may have a positive or negative potential depending upon its position. The connections are such that counter clockwise motion of the arm makes the arm move negative in potential. The moving arm is connected through resistor 162 to the contact 155. It is thus seen that a network exists making the potential of the contact 155 and therefore of the grid of tube 158 a function both of the operation of the rectifiers 135 and 136, and of the position of the arm of potentiometer 150. Thus, if resistors 154 and 162 are of equal value, with the voltage across the resistor 152 positive, and the voltage from the arm to ground equally negative, then the grid will be at ground potential. If, however, the voltage of the arm is positive or not sufficiently negative, then the grid of tube 158 will be positive. In the condition shown, the potentiometer arm is in the process of becoming sufficiently negative to reduce the contact 155 to zero potential. The servo-mechanism is of a type which tends to make the grid of tube 158 approach a definite value, which in the present case is zero. For this purpose, a transformer 163 is provided, the primary of which is connected to a power source such as a 60 cycle line, with the outer terminals of the secondary connected to the anode of tube 158 and to the cathode of a rectifier 164. The center tap of the transformer secondary is connected to ground through the armature of motor 148 which has a field of fixed polarity as produced, for example, by use of a permanent magnet, so that the sense and speed of rotation of said motor are determined by the sense and amount of the D.-C. current through the armature. Capacitor 165 paralleled by a D.-C. center zero voltmeter 166 is connected across the armature of motor 148 to remove A.-C. components of the rectified current to the motor, and to indicate the D.-C. voltage value. The rectifier circuit is completed by use of a battery 167 the positive end of which is connected to the cathode of triode 158, and the negative end of which is connected to ground, and by use of a variable resistor 168 which is connected from the anode of rectifier 164 to ground. Thus, it is seen a balanced arrangement results, in which the sense of the output current of the system to the motor 148 depends upon the relative amounts rectified by devices 158 and 164. By throwing the switch 156 so that the grid of tube 158 is connected to ground, and by setting the variable resistor 168 at a suitable value, the two rectifier currents may be equalized for zero grid voltage of triode 158, as indicated by zero reading of indicator 166. When the switch is restored to the position indicated, the tube 158 will rectify more than device 164 if the grid of tube 158 is positive, and less if it is negative, with a corresponding condition of rotation of the motor armature. Therefore, in a sense the circuit comprising tube 158 and rectifier 164 is a D.-C. amplifier whereby the amount of D.-C. output to motor 148 is controlled by the amount of D.-C. voltage on the grid of triode 158.

The motor 148 operates through the gear box 149 with a shaft 169 operatively connected to drive the arm of potentiometer 150. In the case depicted, the motor is driving the potentiometer to make the arm more negative, thereby reducing the potential on the grid of tube 158. The speed of rotation will be reduced as the grid of tube 158 approaches zero, and the motor will stop when this condition is reached. Thus, a system is provided whereby a one-to-one relationship is maintained between the angular setting of the potentiometer 150 and the D.-C. voltage impressed across line 67.

The servo-mechanism described above is utilized to operate the phase shifter 147, shown schematically. Here, inductors 171 and 172 represent two windings about the same region of space with the magnetic axes of the two coils at right angles, and inductor 173 represents a coil rotatably mounted so that it may be variably coupled magnetically to the two windings 171 and 172 in varying proportions and senses. The arrangement is analogous to the mounting of a coil in the armature space of a two-phase induction motor, except that here the operation is at intermediate frequency. One end of each of the three coils is connected to ground and to one side, termed the ground side, of each of the leads 47 from carrier circuit 22 and the leads 49, 50, 51 to detectors 42 and 46. The other end of rotor coil 173 is connected to the other ungrounded sides of leads 49, 50, and 51. The other ends of stator windings 171 and 172 are connected through capacitor 174 and resistor 175, and through inductor 176 and resistor 177 to the ungrounded side of line 47. Constants are so chosen that the current in winding 171 leads that in winding 172 by ninety electrical degrees, with equal current values for a symmetrical system. The rotor 173 should be sufficiently loosely coupled to the stator windings so that the currents induced into the rotor do not appreciably alter the amount or phase of the current in either stator winding. In this manner, a phase shifter may be constructed such that the amount of electrical phase shift in passing from circuit 22 to detectors 42 and 46 may be equal to the angular setting of an index attached to the rotor shaft. Since the rotor shaft is geared to the shaft for the potentiometer 150, it follows that the rotor setting will follow up the changes in D.-C. voltages impressed upon the line 67. Connections are such that the phase shifter, which is applied to the carrier, causes phase changes of half the value and in the opposite sense to the change in the difference between pilot phases $\phi_1$ and $\phi_2$.

Because phase relations are not as generally understood as amplitude relations, it appears desirable to describe the overall operation in connection with vector diagrams shown in Fig. 4, which includes various lettered sub designations.

Figure 4A:
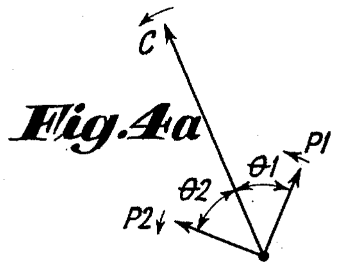

Fig. 4*a* is the normal representation of an amplitude modulated signal due to modulation by a pilot wave, with C the carrier vector, $P_1$ the low side pilot frequency and $P_2$ the high side pilot frequency. $P_1$ and $P_2$ are equal and less than ½ C. The angles $\theta_1$ and $\theta_2$ are at all times equal but in the example shown are about 45°, and increasing since $P_1$ rotates slower than C, and $P_2$ faster than C. This represents conditions at 45° of the modulation cycle, and if C and $P_1$ were being demodulated by one device and C and $P_2$ by a like device, the two outputs would be equal and of the same phase, momentarily 45° in the case shown, as illustrated in Fig. 4*b*. But if, due to the transmitting medium, the phases and magnitudes of C, $P_1$ and $P_2$ are differently disturbed, the relation at the receiver input might be, for example, as in Fig. 4*c* with $P_1=2P_2$, and $\theta_1=\theta_2+90°$. As a result, the two detected currents would not be equal and equally phased but would be as depicted in Fig. 4*d*. The wave form represented by Fig. 4*c* can be restored to that of amplitude modulation by reducing $P_1$ and increasing $P_2$ until they are equal, and retarding C in phase by 45 degrees until $\theta_1$ and $\theta_2$ are equal.

Figure 4C:
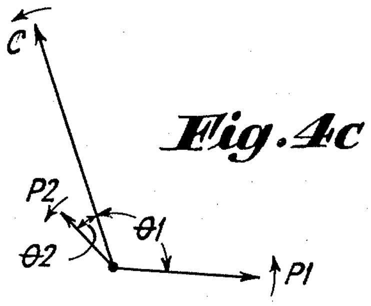
Figure 4B:
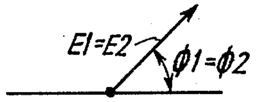
Figure 4D:
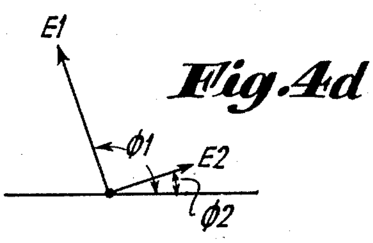

Fig. 4*c* depicts the nature of the carrier and pilots as they exist in combination in rectangles 28 and 30 of Fig. 1, and as they exist individually in rectangles 22, 24, 26 neglecting the effect of delay circuit 16. Fig. 4*d* depicts the pilot signals after demodulation as they appear at the inputs of rectangles 61 and 64. The amplitude comparator 61 operates differentially upon the rectangles 40 and 44 to equalize the pilot intermediate frequencies $P_1$ and $P_2$ impressed upon the detectors 42 and 46. The phase comparator 64 operates differentially on the carrier C by retarding the carrier phase by 45 degrees, thereby both decreasing the angle $\theta_1$ between C and $P_1$ of Fig. 4*c* by 45 degrees, and increasing the angle $\theta_2$ between C and $P_2$ by 45 degrees, thereby equalizing the angles $\theta_1$ and $\theta_2$, which were previously different by ninety degrees. The equalization of magnitudes is by the circuits depicted in Fig. 2, the equalization of angles is by the circuits depicted in Fig. 3, and the net result is an equalization of the output currents of detectors 42 and 46, both for the pilot frequencies and for the signal frequencies that accompany the pilot frequencies. A delay is put in the signal channel by circuit 16 so that the devices in the controlling circuits 40, 44, 48, 61, 64 may have advance notice of the changes in transmission in progress, and may initiate corrective changes which will be accomplished at the proper time.

Figure 4E:
Figure 4F:
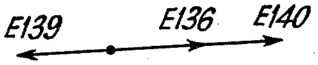
Figure 4G:
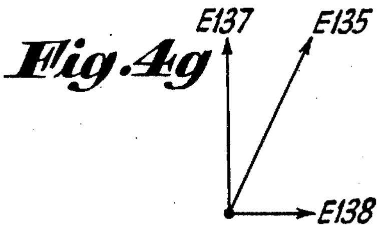
Figure 4H:
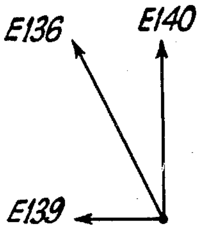

For illustrating the operation of the phase comparator by which the phase equalization is controlled, Figs. 4*e* and 4*f* show the manner in which the rectifier 135 of Fig. 3 receives a greater driving voltage than rectifier 136, when the pilots are as indicated in Fig. 4*d*. Thus, the voltages $E_{137}$ and $E_{138}$ of Fig. 4*e* due to windings 137 and 138 are in phase due to the phase shifting effects of elements 119 to 122, and add up to a large voltage $E_{135}$ for rectifier 135. On the other hand, the voltages $E_{139}$ and $E_{140}$ of Fig. 4*f* due to windings 139 and 140 are opposing and produce a relatively small voltage $E_{136}$ for rectifier 136. If $E_2$ leads $E_1$ by 90 degrees, instead of as in Fig. 4*d*, then rectifier 136 would receive a greater voltage than rectifier 135. If, on the other hand, the pilots were in phase with $\phi_1=\phi_2$, then conditions would be depicted as in Figs. 4*g* and 4*h*, with the voltages in the two sets of windings quadrature related because of the shifting effect of circuits 119 to 122. In Fig. 4*g*, the voltages $E_{137}$ and $E_{138}$ due to windings 137 and 138 add up to a vector $E_{135}$ which is of the same numerical magnitude as voltage $E_{136}$ of Fig. 4*h* which is compounded from the voltages $E_{139}$ and $E_{140}$ due to windings 139 and 140. As a result, the outputs of the two rectifiers would be equal in magnitude, and because of the balanced arrangement, no D.-C. voltage would be impressed on the control line 67.

The invention shown and described may be improved upon readily by those skilled in the art, in various fashions. Thus, the entire signal band may be broken up into a plurality of bands for which individual pilots are provided, with individual corrective arrangements and detectors, thereby increasing the accuracy with which a pilot can represent the band with which it is associated. Further, the pilots $P_1$ and $P_2$ may be transmitted by reversal of phase of one, say $P_2$, so that C, $P_1$ and $P_2$ are related as the carrier and first order side frequencies of a phase modulated signal. These pilots may be effectively used for control of the signals transmitted by amplitude modulation, for example, by reversing the leads 59 at the output of the pilot filter 38. The advantage of such a transmission is that in the output of detectors 42 and 46, the signals would add correctly, but the pilots would cancel, reducing or eliminating the need for a pilot eliminator in circuit 54. Still further, limiters may be inserted in the leads 62 and 63 to the phase comparator 64 to equalize the signal strengths $E_1$ and $E_2$ impressed upon the system of Fig. 3, thereby making the output of the phase comparator more correctly a measure of the phase relation between $\phi_1$ and $\phi_2$, which relation is not influenced by the limiting process. Still further, a super-effective automatic volume control system may be constructed making use of the fact that C, $P_1$ and $P_2$ are transmitted all of the time. Thus, suitably weighted samplings of C, $P_1$ and $P_2$ as they exist in the intermediate frequency part of circuit 10 could be taken and the automatic volume control voltage determined by the totalized energy represented by the three components instead of only the carrier component, due allowance being made for the carrier value being normally greater than the pilot values. Still further, it may be possible to improve the phase comparison system by driving the phase adjuster circuit 48 from pilot frequencies in the outputs of detectors 42 and 46, making the adjustment by servo feedback so that these pilots do not differ appreciably in phase. Still further, it is possible to design an improved phase comparator circuit using two devices producing two D.-C. outputs, which will identify the value and quadrant location of the phase differences of the two pilots with precision.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. In apparatus for receiving wave energy comprising a carrier and upper and lower side bands resulting from modulation of the carrier by signals and a substantially single tone frequency, a detector for each signal side band and the carrier, apparatus coupled to said detectors for combining the detected signal side bands to recover the original signals, a detector for each side tone frequency and the carrier, apparatus coupled to said last named detectors for comparing the phases and amplitudes of the detected tone frequencies to derive energy representative of displacements in the relative phases of the detected tone frequencies and energy representative of differences in amplitude of the detected tone frequencies, and apparatus controlled by said derived energies respectively for adjusting the relative phases and relative amplitudes of the detected signals in accordance with said derived energies.

2. In apparatus for receiving wave energy comprising a carrier and upper and lower side bands resulting from modulation of the carrier by signals and a substantially single tone frequency, a detector for each signal side band and the carrier, apparatus including a carrier selecting circuit coupled to said detectors for feeding carrier and side band energy thereto, apparatus coupled to said detectors for combining the detected signal side bands to recover the original signals, a detector for each side tone frequency and the carrier, apparatus coupled to said last named detectors for comparing the phases of the detected tone frequencies to derive energy representative of displacements in the relative phases of the detected tone frequencies, and apparatus controlled by said derived energy and associated with the carrier selecting circuit for controlling the phase of the carrier used in said detectors in accordance with the derived energy.

3. In apparatus for receiving wave energy comprising a carrier and upper and lower side bands resulting from modulation of the carrier by signals and a substantially single tone frequency, a detector for each signal side band and the carrier, apparatus including side band selecting circuits coupled to said detectors for feeding carrier energy to each thereof, upper side band energy to one thereof and lower side band energy to the other thereof, apparatus coupled to said detectors for combining the detected signal side bands to recover the original signals, a detector for each side tone frequency and the carrier, apparatus coupled to said last named detectors for comparing the amplitudes of the detected tone frequencies to derive energy representative of differences in amplitude of the detected tone frequencies, and apparatus associated with the respective side band selecting circuits and controlled by said derived energy for adjusting the relative amplitudes of the side bands as detected to correspondingly control the amplitudes of the detected signals as combined.

4. In apparatus for receiving wave energy comprising a carrier and upper and lower side bands resulting from modulation of the carrier by signals and a substantially single tone frequency, a detector for each signal side band and the carrier, apparatus coupled to said detectors for combining the detected signal side bands to recover the original signals, a detector for each side tone frequency and the carrier, apparatus coupled to said last named detectors for comparing the phases and amplitudes of the detected tone frequencies to derive energy representative of displacements in the relative phases of the detected tone frequencies and energy representative of differences in amplitude of the detected tone frequencies, and apparatus controlled by said derived energies for controlling the phase of the carrier used in each of the first named detectors and for controlling the amplitudes of the upper and lower side bands used in said first named detectors.

5. In apparatus for receiving wave energy comprising a carrier and upper and lower side bands resulting from modulation of the carrier by signals and a substantially single tone frequency, a detector for each signal side band and the carrier, apparatus including carrier and side band selecting circuits coupled to said detectors for feeding carrier energy to each thereof, upper side band energy to one thereof and lower side band energy to the other thereof, apparatus coupled to said detectors for combining the detected signal side bands to recover the original signals, a detector for each side tone frequency and the carrier, apparatus coupled to said last named detectors for comparing the phases of the detected tone frequencies to derive energy representative of displacements in the relative phases of the detected tone frequencies, apparatus associated with the carrier selecting circuit and said phase comparing apparatus for controlling the phase of the carrier fed to said first named detectors in accordance with said representative energy, apparatus coupled to said second named detectors for comparing the amplitudes of the detected tone frequencies to derive energy representative of differences in amplitude of the detected tone frequencies, and apparatus associated with the side band selecting circuits and controlled by said last named representative energy for controlling the amplitudes of the respective side bands selected and fed to said first named detectors.

6. In apparatus for reducing the effects of fading on modulated energy comprising a carrier and side bands resulting from modulation of carrier energy by signals and by oscillations of substantially single frequency, a time delay circuit excited by said modulated energy, selective circuits coupled to said delay circuit for separating the upper side band, carrier and lower side band each from the other, other selective circuits for isolating the carrier and one side band and the carrier and the other side band, a detector coupled to each of said other selective circuits, a circuit coupled to each detector for selecting and amplifying said oscillations of substantially single frequency, a phase comparing circuit coupled to each of said selecting and amplifying circuits for deriving an output depending upon the relative phases of the oscillations of single frequency selected thereby, means for adjusting the phase of the carrier derived from said first-mentioned selective circuits in accordance with the output of said phase comparing circuit, an amplitude comparing circuit coupled to each of said detectors, and means for controlling the amplification of the side bands in accordance with the output of said amplitude comparing circuit.

JOHN HAYS HAMMOND, Jr.

REFERENCES CITED

The following references are of record in the file of this patent:

UNITED STATES PATENTS

| Number | Name | Date |
|---|---|---|
| 1,743,132 | Green | Jan. 14, 1930 |
| 1,777,355 | Fetter | Oct. 7, 1930 |
| 1,882,653 | Sedlmager | Oct. 11, 1932 |
| 1,999,902 | Hansell | Apr. 30, 1935 |
| 2,375,126 | Mathes | May 1, 1945 |

FOREIGN PATENTS

| Number | Country | Date |
|---|---|---|
| 543,602 | Great Britain | Mar. 5, 1942 |